US012555519B2

(12) United States Patent
Chen et al.

(10) Patent No.: US 12,555,519 B2
(45) Date of Patent: Feb. 17, 2026

(54) PRE-CHARGE CONTROL METHOD AND DEVICE FOR DISPLAY PANEL, DISPLAY SYSTEM AND DRIVING METHOD THEREOF

(71) Applicant: NOVATEK MICROELECTRONICS CORP., Taiwan (CN)

(72) Inventors: Hsuan-Yu Chen, Taiwan (CN); Yu-Sheng Ma, Taiwan (CN); Jin-Yi Lin, Taiwan (CN); Min-Yang Chiu, Taiwan (CN); Jhih-Siou Cheng, Taiwan (CN); Chun-Fu Lin, Taiwan (CN)

(73) Assignee: NOVATEK MICROELECTRONICS CORP., Taiwan (CN)

( * ) Notice: Subject to any disclaimer, the term of this patent is extended or adjusted under 35 U.S.C. 154(b) by 0 days.

(21) Appl. No.: 18/790,954

(22) Filed: Jul. 31, 2024

(65) Prior Publication Data

US 2025/0239206 A1 Jul. 24, 2025

Related U.S. Application Data

(60) Provisional application No. 63/624,766, filed on Jan. 24, 2024.

(30) Foreign Application Priority Data

Apr. 3, 2024 (CN) ........................ 202410400747.X

(51) Int. Cl.
*G09G 3/32* (2016.01)

(52) U.S. Cl.
CPC ....... *G09G 3/32* (2013.01); *G09G 2310/0248* (2013.01); *G09G 2310/0267* (2013.01); *G09G 2310/0275* (2013.01); *G09G 2310/08* (2013.01)

(58) Field of Classification Search
CPC ....... G09G 3/32–3291; G09G 2300/06; G09G 2310/0243–0251;
(Continued)

(56) References Cited

U.S. PATENT DOCUMENTS 10,950,167 B1 * 3/2021 Chan .................... G09G 3/3233
10,964,277 B1 * 3/2021 Hsu ........................ G09G 3/344
(Continued)

FOREIGN PATENT DOCUMENTS

CN 1976553 A 6/2007
CN 100541567 C 9/2009
(Continued)

OTHER PUBLICATIONS

English translation of KR-2008-0066421-A (Year: 2008).*
Office Action, corresponding Taiwan application No. 113122594, dated May 14, 2025.

*Primary Examiner* — Nathan Danielsen
(74) *Attorney, Agent, or Firm* — MARSHALL, GERSTEIN & BORUN LLP

(57) ABSTRACT

A pre-charge control method and device for a display panel, a display system and a driving method thereof are provided. The pre-charge control method for the display panel includes: obtaining a number of data channels on the display panel to be turned on during a turn-on period of a scanning line; determining a target pre-charge voltage for pre-charging the data channels to be turned on based on the number of the data channels to be turned on; and pre-charging the data channels to be turned on based on the target pre-charge voltage before turning on the data channels to be turned on.

18 Claims, 8 Drawing Sheets

(58) Field of Classification Search
CPC ........................ G09G 2310/0267–0275; G09G 2310/0289–0294; G09G 2310/04–063; G09G 2310/08; G09G 2320/0209; G09G 2320/0214; G09G 2320/0223; G09G 2320/0233; G09G 2320/0242; G09G 2320/0252; G09G 2320/04; G09G 2320/0686; G09G 2320/0693
See application file for complete search history.

(56) References Cited

U.S. PATENT DOCUMENTS

| | | | | |
|---|---|---|---|---|
| 2004/0223008 | A1 | 11/2004 | Ishizuka et al. | |
| 2005/0280613 | A1 | 12/2005 | Takei et al. | |
| 2008/0303809 | A1* | 12/2008 | Lee | G09G 3/3696 345/215 |
| 2017/0309217 | A1* | 10/2017 | Kim | G09G 3/2092 |
| 2021/0375200 | A1 | 12/2021 | Lin et al. | |
| 2022/0392384 | A1* | 12/2022 | Cho | G09G 3/20 |
| 2023/0010366 | A1 | 1/2023 | Son et al. | |

FOREIGN PATENT DOCUMENTS

| | | | | |
|---|---|---|---|---|
| KR | 20080066421 | A * | 7/2008 | H03K 7/08 |
| TW | I645396 | B | 12/2018 | |
| TW | 202345657 | A | 11/2023 | |

* cited by examiner

PRE-CHARGE CONTROL METHOD AND DEVICE FOR DISPLAY PANEL, DISPLAY SYSTEM AND DRIVING METHOD THEREOF

CROSS-REFERENCE TO RELATED APPLICATIONS

The present disclosure claims the priority of U.S. provisional application No. 63/624,766 filed on Jan. 24, 2024 and Chinese Patent Application No. 202410400747.X filed on Apr. 3, 2024, the contents of which are incorporated into this disclosure by reference in its entirety.

TECHNICAL FIELD

The present disclosure relates to a field of display technologies, and more particularly, to a pre-charge control method and device for a display panel, a display system and a driving method thereof.

BACKGROUND

It is known that in the display driving of a display panel such as a light emitting diode (LED) panel, usually a dynamic driving mode is used for driving, where a scanning line is turned on line by line to select a row of LEDs corresponding to the scanning line, and LEDs in the row to be lit/turned on are lit via simultaneously providing a driving current to data channels corresponding to the LEDs. However, the existence of a parasitic capacitor of a light emitting diode will cause that: before the light emitting diode can be lit, its parasitic capacitor has to be charged first to make its voltage at both ends reach the turn-on voltage thereof. Therefore, the parasitic capacitor is usually pre-charged to slightly lower than the turn-on voltage of the light emitting diode before the turn-on period thereof, so that the light emitting diode can be quickly lit after its turn-on period arrives.

However, a scanning switch used to control the scanning line is not an ideal switch, and it has an equivalent on-resistance when it is turned on. If more data channels are turned on at the same time, a current flowing through the equivalent on-resistance will be greater, and accordingly, a voltage on the equivalent on-resistance will be higher. The voltage on the equivalent on-resistance will correspondingly increase the cathode potential of a light emitting diode (in a case where the display panel adopts a common cathode structure) or decrease the anode potential of the light emitting diode (in a case where the display panel adopts a common anode structure), thus affecting the actual on-time of the light emitting diode.

Therefore, a technical solution that can reduce the influence of the voltage on the equivalent on-resistance of the scanning switch on the on-time of the light emitting diode is needed.

SUMMARY

Accordingly, the present disclosure provides a pre-charge control method and device for a display panel, as well as a display system and a driving method thereof.

According to one aspect of the present disclosure, there is provided a pre-charge control method for a display panel, comprising: obtaining a number of data channels on the display panel to be turned on during a turn-on period of a scanning line; determining a target pre-charge voltage for pre-charging the data channels to be turned on based on the number of the data channels to be turned on; and pre-charging the data channels to be turned on based on the target pre-charge voltage before turning on the data channels to be turned on.

According to another aspect of the present disclosure, there is provided a pre-charge control device for a display panel, comprising: means for obtaining a number of data channels on the display panel to be turned on during a turn-on period of a scanning line; means for determining a target pre-charge voltage for pre-charging the data channels to be turned on based on the number of the data channels to be turned on; and means for pre-charging the data channels to be turned on based on the target pre-charge voltage before turning on the data channels to be turned on.

According to another aspect of the present disclosure, there is provided a driving method for a display system, where the display system comprises a display panel, the display panel comprises a plurality of light emitting diodes, as well as a plurality of scanning lines and a plurality of data channels connected to the light emitting diodes, the driving method comprising: turning on a scanning line of the plurality of scanning lines; pre-charging, at a pre-charge stage, data channels on the display panel to be turned on during a turn-on period of the scanning line based on a target pre-charge voltage, wherein the target pre-charge voltage is determined based on a number of the data channels to be turned on; and, providing, at a display stage, a corresponding driving current to the data channels to be turned on.

According to another aspect of the present disclosure, there is provided a display system comprising: a display panel comprising a plurality of light emitting diodes, as well as a plurality of scanning lines and a plurality of data channels connected to the light emitting diodes; at least one scanning circuit; at least one source driver; and, a timing controller, where the timing controller is configured to: controlling a scanning circuit of the at least one scanning circuit to turn on a scanning line of the plurality of scanning lines; controlling the at least one source driver to pre-charge, at a pre-charge stage, data channels on the display panel to be turned on during a turn-on period of the scanning line based on a target pre-charge voltage, wherein the target pre-charge voltage is determined based on a number of the data channels to be turned on; and, controlling the at least one source driver to provide, at a display stage, a corresponding driving current to the data channels to be turned on.

To make the above features and advantages of the present disclosure more obvious and easy to understand, examples are listed below, which are described in detail with the drawings.

BRIEF DESCRIPTION OF THE DRAWINGS

The drawings are provided to provide a further understanding of the embodiments of the present disclosure, constitute a part of the specification, and serve to explain the present disclosure together with the embodiments of the present disclosure, but do not constitute limitations of the present disclosure. In the drawings, the same reference numeral generally represents the same part or step.

FIG. 1(*b*) shows a schematic diagram of a current path when data channels are turned on in a case where the scanning line S[1] is turned on.

FIG. 1(*c*) shows a schematic diagram of an LED display system 100(*c*).

FIG. 5(*b*) shows a schematic diagram of another LED display system 500-B.

DETAILED DESCRIPTION

In the following, the implementation of the present disclosure will be described in detail with the drawings and examples, to fully understand and implement the implementation process of the present disclosure to solve the technical problem and achieve the technical effect by using technical means. It should be noted that as long as there is no conflict, various embodiments in this disclosure and various features in each embodiment can be combined with each other, and the formed technical scheme is within the protection scope of this disclosure.

Meanwhile, in the following description, for explanation, numerous specific details are set forth to provide a thorough understanding of the embodiments of the present disclosure. However, it will be obvious to those skilled in the art that the present disclosure may be practiced without the specific details herein or the specific ways described. For example, in the following, the embodiments of the present disclosure will be mainly described by taking an LED display panel and an LED display system including the same as an example, but they are only taken as examples. Those skilled in the art will understand that the solutions proposed in the present disclosure can also be applied to other types of display panels, such as Mini-LED and Micro-LED display panels, and display systems including the same, and there is no restriction here.

Figure 1A:
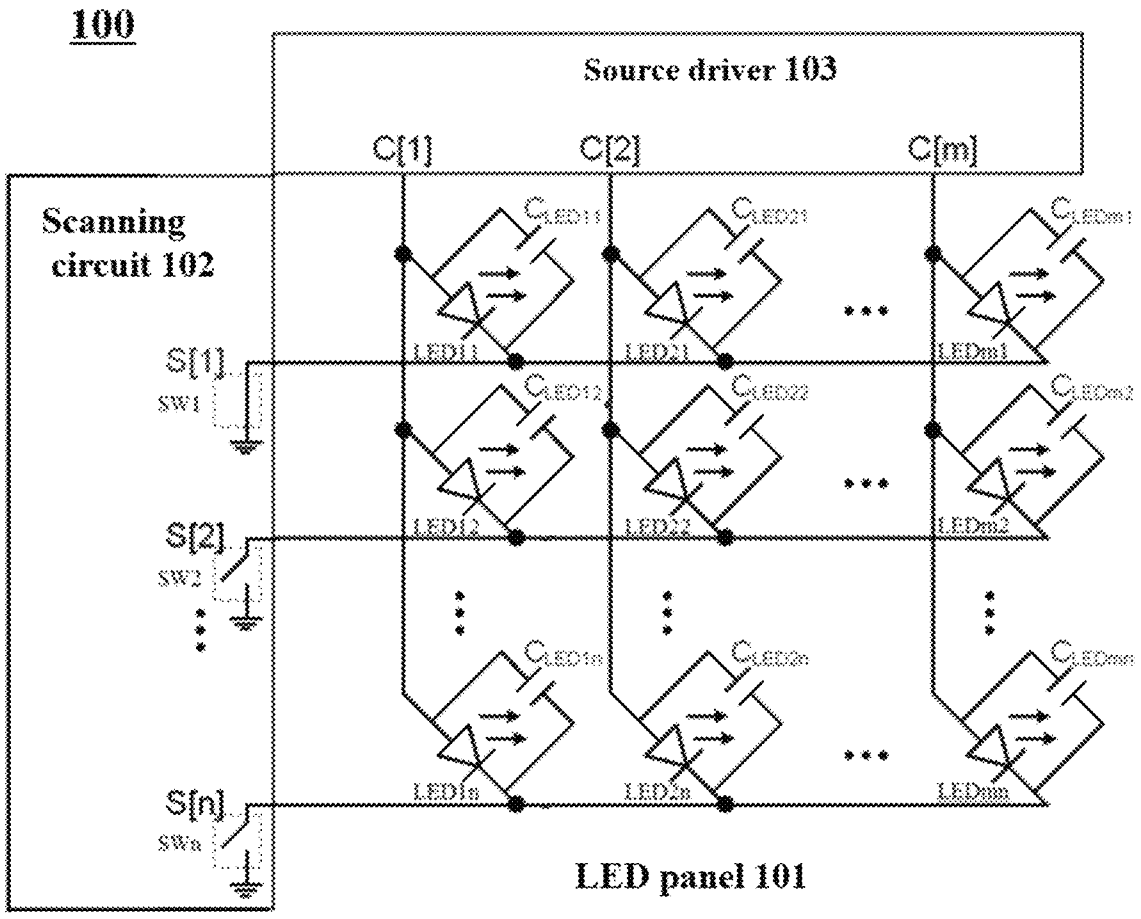
FIG. 1(*a*) shows a schematic diagram of an LED display system 100.
Figure 1B:
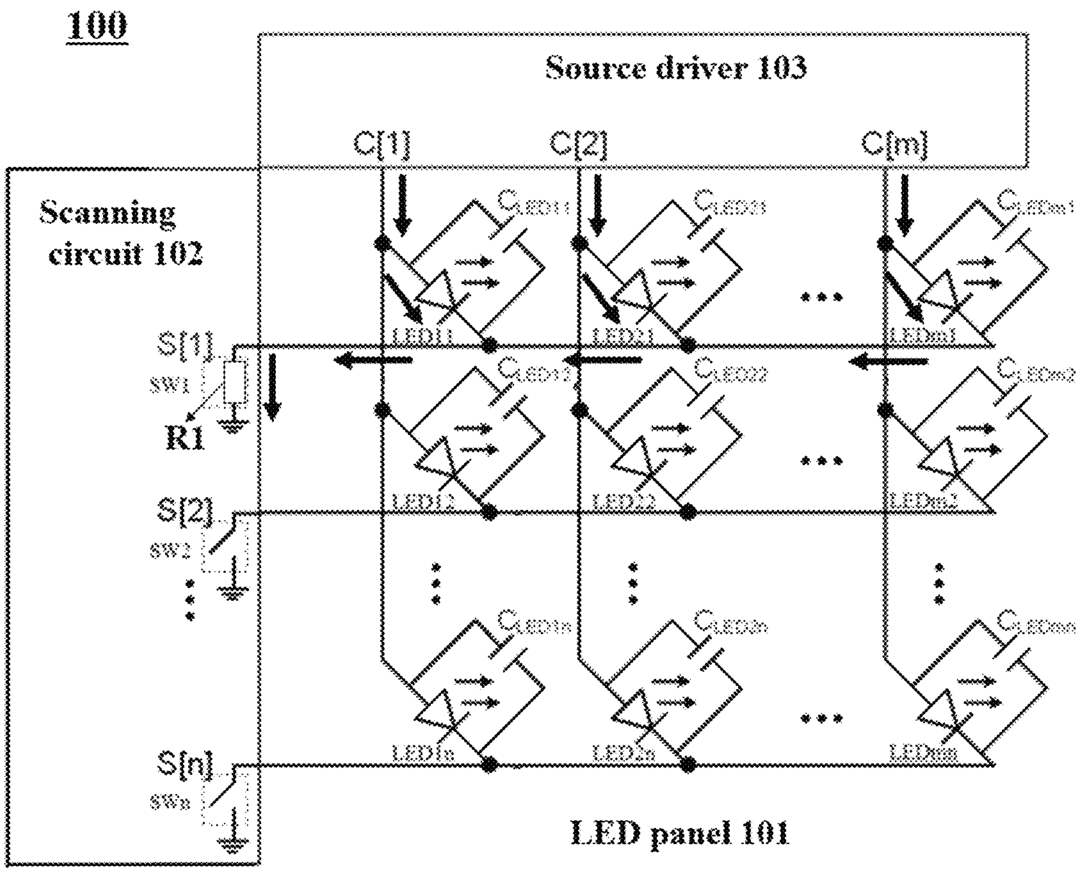
Figure 1C:
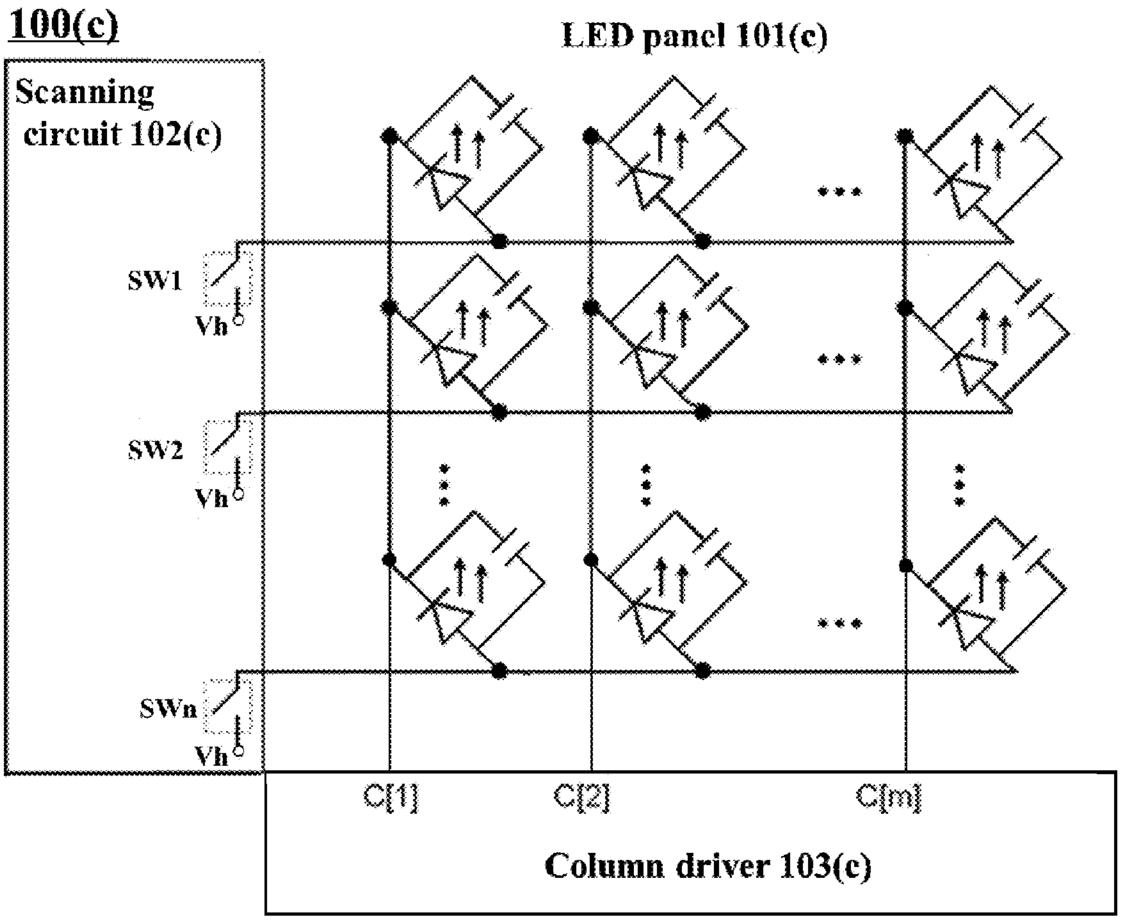

FIG. 1(*a*) shows a schematic diagram of an LED display system 100, which includes an LED panel 101 with a common cathode structure. Hereinafter, embodiments according to the present disclosure will be described mainly by taking an LED panel with a common cathode structure as an example, but those skilled in the art can understand that the solutions proposed in the present disclosure can also be applied to an LED panel with a common anode structure, and there is no restriction here.

As shown in FIG. 1(*a*), an LED display system 100 includes an LED panel 101, a scanning circuit (also called a gate driver) 102, and a source driver (also called a column driver) 103. The LED panel 101 includes a plurality of light emitting diodes (LEDs) LED11~LEDmn, where m and n are positive integers. Each LED may correspond to a sub-pixel of a multi-color pixel (for example, an RGB pixel). For example, LED11, LED21, and LED31 (not shown) may correspond to red (R), green (G) and blue (B) sub-pixels of an RGB pixel respectively. The LED panel 101 also includes a plurality of data channels (also called data lines) C[1]~C[m] connected to the anode of the LEDs, and a plurality of scanning lines S[1]~S[n] connected to the cathode of the LEDs.

The scanning circuit 102 includes a plurality of scanning switches SW1-SWn for turning on and off corresponding scanning lines. The source driver 103 includes a plurality of constant current sources (not shown) for driving the plurality of data channels C[1]~C[m]. When display driving, the scanning circuit 102 can turn on one of the plurality of scanning lines S[1]~S[n] line by line, so as to select a row of light emitting diodes connected to this scanning line. Subsequently, the source driver 103 can turn on some or all of the light emitting diodes in this row by supplying driving current to the corresponding data channel(s). For example, FIG. 1(*a*) exemplarily shows that the scanning line S[1] is turned on by turning on the scanning switch SW1 to ground the scanning line S[1], so as to select the first row of LED11-LEDm1, and then the source driver 103 can drive some or all of the data channels C[1]-C[m] to turn on corresponding LED(s) of the LED11-LEDm1.

As further shown in FIG. 1(*a*), the plurality of light emitting diodes LED11~LEDmn also include their respective parasitic capacitors $C_{LED11}$~$C_{LEDmn}$, and each of these parasitic capacitors is regarded as being connected in parallel with the corresponding light emitting diode. As mentioned above, in order to overcome the influence of these parasitic capacitors on the display brightness of light emitting diodes, the source driver usually includes a plurality of pre-charge circuits (not shown) for pre-charging the parasitic capacitors. These pre-charge circuits can be independent of the constant current sources in the source driver and can be realized by various types of adjustable voltage source circuits with adjustable output voltage, as long as they can output a corresponding output voltage based on the input reference voltage to pre-charge the parasitic capacitors, which is not limited here. When the scanning circuit 102 has turned on a scanning line (e.g., scanning line S[1]), but the source driver 103 has not driven one or more data channels to turn on the corresponding light emitting diode(s), the one or more data channels (that is, the parasitic capacitor of the light emitting diodes connected to them) can be pre-charged by corresponding pre-charging circuits, so that the voltages at both ends of the light emitting diodes are close to their turn-on voltages after pre-charging, thereby accelerating the turning on of the light emitting diodes.

Figure 2:
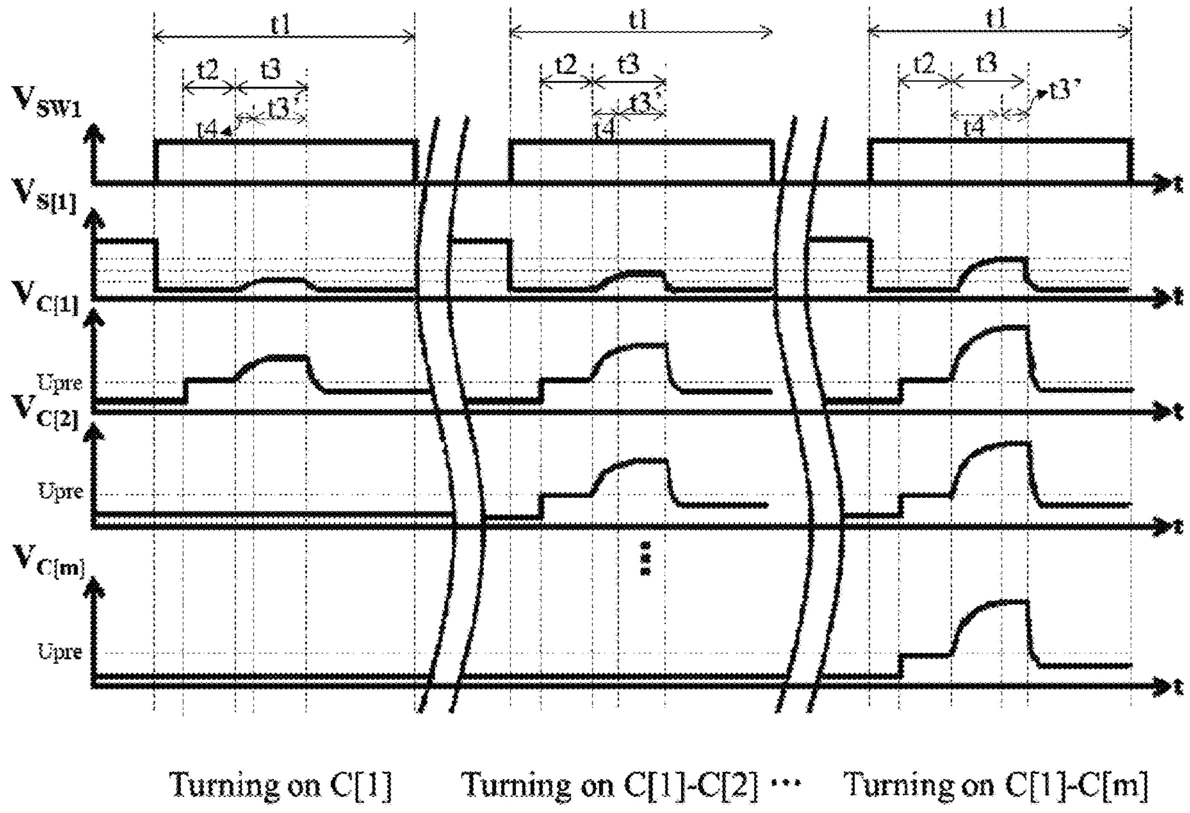
FIG. 2 shows a schematic diagram of signal potentials in a case where the scanning line S[1] is turned on according to prior art.

FIG. 1(*b*) shows a schematic diagram of a current path when data channels are turned on in a case where the scanning line S[1] is turned on. FIG. 2 shows a schematic diagram of signal potentials in a case where the scanning line S[1] is turned on according to the prior art, where the left, middle and right parts of FIG. 2 correspond to cases of turning on only the data channel C[1], turning on the data channels C[1]-C[2] and turning on all the data channels C[1]-C[m] respectively, and other data channel turning-on cases are omitted. Next, with reference to FIG. 1(*b*) and FIG. 2, the influence of the voltage on the equivalent on-resistance of the scanning switch on the on-time of the light emitting diodes will be described, where the more data channels are turned on at the same time, the greater the voltage on the equivalent on-resistance, and the more serious the influence will be.

As shown in FIG. 2, a switching control signal $V_{SW1}$ of the scanning switch SW1 is at a high level during a turn-on period t1 to control the scanning switch SW1 to be turned on, thereby grounding the scanning line S[1] to turn it on. Correspondingly, a potential $V_{S[1]}$ at the scanning line S[1](that is, the cathode potential of the light emitting diode connected to the scanning line S[1]) becomes low level after the scanning switch SW1 is turned on.

Subsequently, as mentioned above, before turning on one or more data channels to be turned on, the data channels to be turned on can be pre-charged by the pre-charge circuits in the source driver during a pre-charge period t2 (that is, pre-charging the parasitic capacitors of the light emitting diodes to which the data channels to be turned on are connected), so that the voltages across the corresponding light emitting diodes are slightly lower than the turn-on voltages of the light emitting diodes after pre-charging. For example, as shown in FIG. 2, when only the data channel C[1] is to be turned on, the data channel C[1] is pre-charged during t2 to raise its output voltage $V_{C[1]}$; When data channels C[1] and C[2] are to be turned on, they are pre-charged during t2 to increase their output voltages $V_{C[1]}$ and $V_{C\,[2]}$; . . . ; and so on. As shown in FIG. 2, in prior art, regardless of the number of the data channels to be turned on, the data channels to be turned on are pre-charged based on a same pre-charge voltage Upre, thereby charging the output voltage of the data channels to the pre-charge voltage Upre.

After the pre-charge period t2, a target on period t3 of LEDs enters. During this target on period t3, the source driver turns on its internal constant current sources to provide driving current for the data channels to be turned on, thus turning on the corresponding LEDs. However, since the voltages across the LEDs are still slightly lower than the turn-on voltages of the LEDs after pre-charging, the driving current must first charge the parasitic capacitors of the LEDs, and the voltages across the LEDs can be fully charged to the turn-on voltages of the LEDs before the LED can be actually turned on. Correspondingly, as shown in FIG. 2, an actual on period t3' of the LEDs is shorter than the target on period t3, and there is a driving current charging period t4 between the pre-charge period t2 and the actual on period t3' to charge the parasitic capacitor of the LEDs with driving current.

As shown in FIG. 1(*b*), since each scanning switch has an equivalent on-resistance when it is actually turned on (for example, FIG. 1(*b*) shows an equivalent on-resistance R1 of the scanning switch SW1 when it is actually turned on), if more data channels of the data channels C[1]~C[m] are turned on at the same time, the current flowing through the equivalent on-resistance will be greater (that is, the voltage on the equivalent on-resistance will be greater). Therefore, it takes more time to charge the parasitic capacitor of the light emitting diodes with the driving current on the data channels, so as to raise the anode potential of the light emitting diodes higher, so that the light emitting diodes can be turned on, which will affect the turn-on time of the light emitting diodes. For example, as shown schematically in FIG. 2, as the number of the data channels turned on at the same time increases, the cathode potential of the light emitting diodes (i.e., the potential $V_{S[1]}$ at the scanning line S[1]) is raised higher, and correspondingly, the time for charging the parasitic capacitor of the light emitting diodes with the driving current on the data channels (i.e., the driving current charging period t4) will be longer, while the actual on period t3' of the light emitting diodes is correspondingly shorter, thus affecting the display time of the light emitting diodes.

In order to solve the above problem, in the embodiments according to the present disclosure, the target pre-charge voltage will be dynamically adjusted according to the number of the data channels to be turned on, so that the influence of the voltage of the equivalent on-resistance of the scanning switch on the on-time of the light emitting diodes can be compensated in advance through the pre-charge process, so that the actual turn-on period of the light emitting diodes can be maintained basically unchanged under the condition that any number of data channels are to be turned on.

Figure 3:
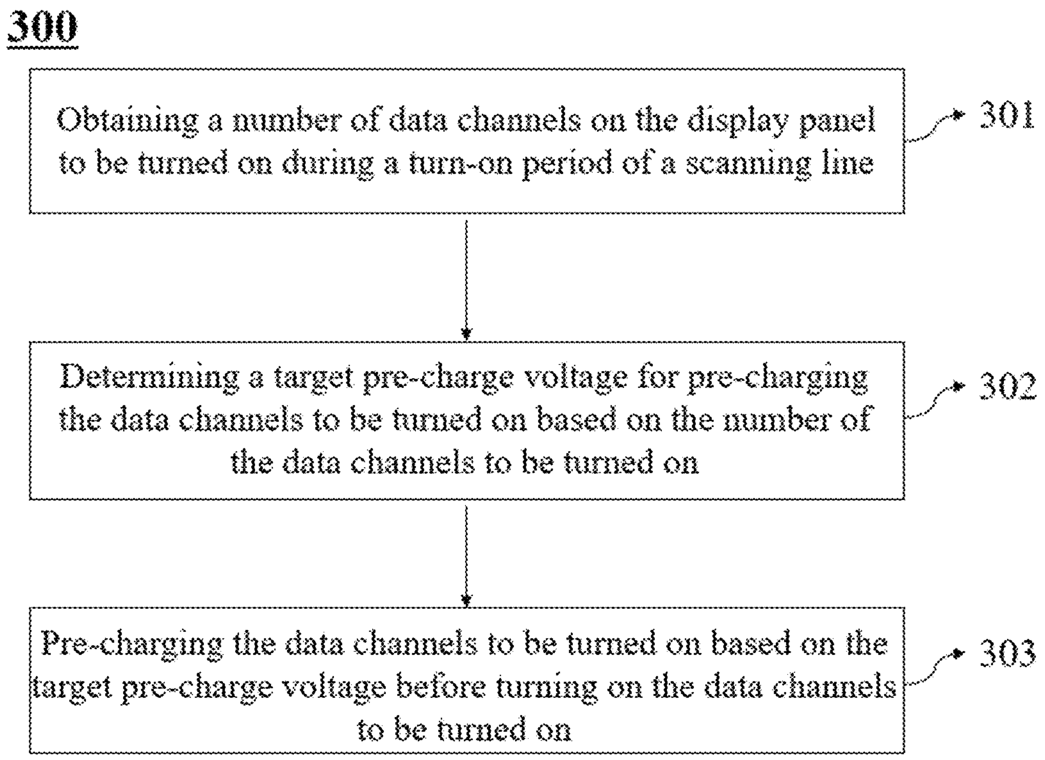
FIG. 3 illustrates a pre-charge control method 300 for a display panel according to an embodiment of the present disclosure.

FIG. 3 illustrates a pre-charge control method 300 for a display panel according to an embodiment of the present disclosure. As mentioned above, the display panel may be an LED display panel or other types of display panels such as Mini-LED and Micro-LED display panels.

As shown in FIG. 3, in step S301, a number of data channels on the display panel to be turned on during a turn-on period of a scanning line is obtained. Referring to FIG. 1(*a*) again, the scanning line may be any one of scanning lines S[1]~S[n] (for example, scanning line S [1]). According to specific display requirements, after the scanning line is turned on, the source driver can turn on a certain number of data channels to turn on the corresponding light emitting diodes for display. Usually, there is an internal controller in the source driver, which can know the number of the data channels to be turned on in advance and control the driving circuits in the source driver to generate driving control signals for turning on the corresponding data channels. In one example, the number of the data channels on the display panel to be turned on during the turn-on period of the scanning line can be obtained from the internal controller in the source driver. In other examples, the number of the data channels on the display panel to be turned on during the turn-on period of the scanning line can also be obtained from other components (for example, an external controller for providing control information, which includes the number of the data channels to be turned on, to the internal controller in the source driver), and there is no limitation here.

In step S302, a target pre-charge voltage for pre-charging the data channels to be turned on is determined based on the number of the data channels to be turned on.

In this step, determining the target pre-charge voltage for pre-charging the data channels to be turned on based on the number of the data channels to be turned on comprises: determining a voltage adjustment value based on the number of the data channels to be turned on; and adjusting a preset pre-charge voltage value of the data channels to be turned on based on the voltage adjustment value, to obtain the target pre-charge voltage for pre-charging the data channels to be turned on. The preset pre-charge voltage value can be a fixed value lower than the turn-on voltages of the light emitting diodes. Because the turn-on voltages of light emitting diodes with different colors are usually different, optionally, the turn-on voltages of the light emitting diodes with different colors may be used to set corresponding preset pre-charge voltage values. For example, assuming that the turn-on voltages of red, green and blue LEDs are 1.6V, 2.2V and 3.5V respectively, the preset pre-charge voltage values of the data channels corresponding to the red, green and blue LEDs can be, for example, 1V, 2V and 3V respectively.

In this step, the voltage adjustment value may be the voltage on the equivalent on-resistance of the scanning switch as determined or estimated based on the number of the data channels to be turned on. Therefore, as compared with the prior art using a fixed pre-charge voltage, the embodiments of the present disclosure can compensate the voltage on the equivalent on-resistance of the scanning switch by dynamically adjusting the pre-charge voltage, so as to reduce the influence of the voltage on the on-time of the light emitting diodes. Next, a specific example of determining the voltage adjustment value based on the number of the data channels to be turned on according to an embodiment of the present disclosure will be described.

In one example, it can be idealized that every time the number of the data channels to be turned on is increased by 1, the voltage on the equivalent on-resistance of the scanning switch will be increased by a fixed voltage increment (called a preset voltage increment). Accordingly, in this example, determining the voltage adjustment value based on the number of the data channels to be turned on comprises: determining a preset voltage increment corresponding to each of the data channels to be turned on; and determining the voltage adjustment value based on the preset voltage increment corresponding to each data channel and the number of the data channels to be turned on. That is, the voltage adjustment value can be simply calculated by multiplying the preset voltage increment by the number of the data channels to be turned on. In this example, the preset voltage increment corresponding to each data channel can be determined based on the product of a rated working current of an LED and the equivalent on-resistance of the scanning switch. However, the present disclosure is not limited to this, and those skilled in the art can also estimate or determine the preset voltage increment in other ways.

As mentioned above, each light emitting diode can correspond to a sub-pixel of a multi-color pixel (for example, an RGB pixel). That is, the data channels to be turned on connected to these light emitting diodes may include data channels of one or more colors (for example, the data channels connected to red/green/blue light emitting diodes are called red/green/blue data channels). Accordingly, in this example, data channels of different colors to be turned on can be distinguished, and for data channels of each color, the preset voltage increment corresponding to a single data channel of this color can be determined respectively, and the voltage adjustment value can be determined based on the number of the data channels to be turned on for each color and the preset voltage increment corresponding to a single data channel of the color. That is, the number of the data channels to be turned on for each color can be multiplied by the preset voltage increment corresponding to a single data channel of this color, and finally the obtained products can be summed to obtain the voltage adjustment value.

In this example, in order to determine the preset voltage increment corresponding to a single data channel of each color, a preset driving current value corresponding to the single data channel of the color can be determined first, and, the preset voltage increment corresponding to the single data channel of the color can be determined based on the preset driving current value and the equivalent on-resistance of the scanning switch connected to the scanning line. As mentioned above, the preset driving current value corresponding to a single data channel of each color can be the rated working current value of the light emitting diode it is connected to. However, the present disclosure is not limited to this, and those skilled in the art can also estimate or determine the preset driving current value by other ways.

Specifically, for example, assuming that the preset driving current values corresponding to a single data channel of red, green and blue are 5 mA, 3 mA and 2 mA respectively, and the resistance value of the equivalent on-resistance of the scanning switch is 200 mΩ, it can be calculated that the preset voltage increment corresponding to a single red, green or blue data channel is 1 mV, 0.6 mV or 0.4 mV respectively. Table 1 below gives various examples of voltage adjustment values determined based on the above preset voltage increments and the number of the data channels to be turned on for each color.

| Number of the data channels to be turned on | | | Voltage adjustment |
|---|---|---|---|
| red | green | blue | value (mV) |
| 1 | 0 | 0 | 1.0 |
| 5 | 3 | 4 | 8.40 |
| 10 | 8 | 5 | 16.8 |
| 20 | 15 | 25 | 39.0 |
| 30 | 35 | 40 | 67.0 |
| 54 | 54 | 54 | 108.0 |

For example, if the number of the red, green and blue data channels to be turned on is 30, 35 and 40 respectively (corresponding to the penultimate row in Table 1), the voltage adjustment value can be calculated as 1 mV*30+0.6 mV*35+0.4 mV*40=67 mV.

Because the driving current in each data channel may change according to the actual brightness requirements of the light emitting diodes, the voltage on the equivalent on-resistance of the scanning switch will also change. Therefore, in another example, the voltage adjustment value can be determined more accurately according to the actual driving current amount to be provided to each of the data channels to be turned on. In this example, determining the voltage adjustment value based on the number of the data channels to be turned on comprises: obtaining an amount of driving current to be provided to each of the data channels to be turned on during the turn-on period of the scanning line; and determining the voltage adjustment value based on the amount of driving current to be provided to each of the data channels to be turned on. Specifically, the amount of driving current to be provided to each of the data channels to be turned on obtained can be summed to determine the driving current sum, which is equivalent to the total current flowing through the scanning switch. After determining the driving current sum, the voltage adjustment value can be determined based on the driving current sum and the equivalent on-resistance of the scanning switch, that is, the voltage adjustment value can be determined by multiplying the driving current sum with the equivalent on-resistance of the scanning switch.

After the voltage adjustment value is obtained in the above way, the preset pre-charge voltage value can be adjusted to obtain the target pre-charge voltage. As mentioned above, optionally, the corresponding pre-charge voltage preset values can be determined for light emitting diodes of different colors respectively, so that the pre-charge voltage preset values of the light emitting diodes of each color can be adjusted based on the voltage adjustment values to obtain their corresponding target pre-charge voltages.

Finally, in step S303, the data channels to be turned on is pre-charged based on the target pre-charge voltage before turning on the data channels to be turned on.

In this step, the target pre-charge voltage determined in step S302 can be used as the reference voltage of the pre-charge circuits, so that the pre-charge circuits can output an output voltage with a corresponding voltage amount to pre-charge the parasitic capacitors, so that the anode or cathode voltages of the LED can reach the target pre-charge voltage through pre-charge.

Figure 4:
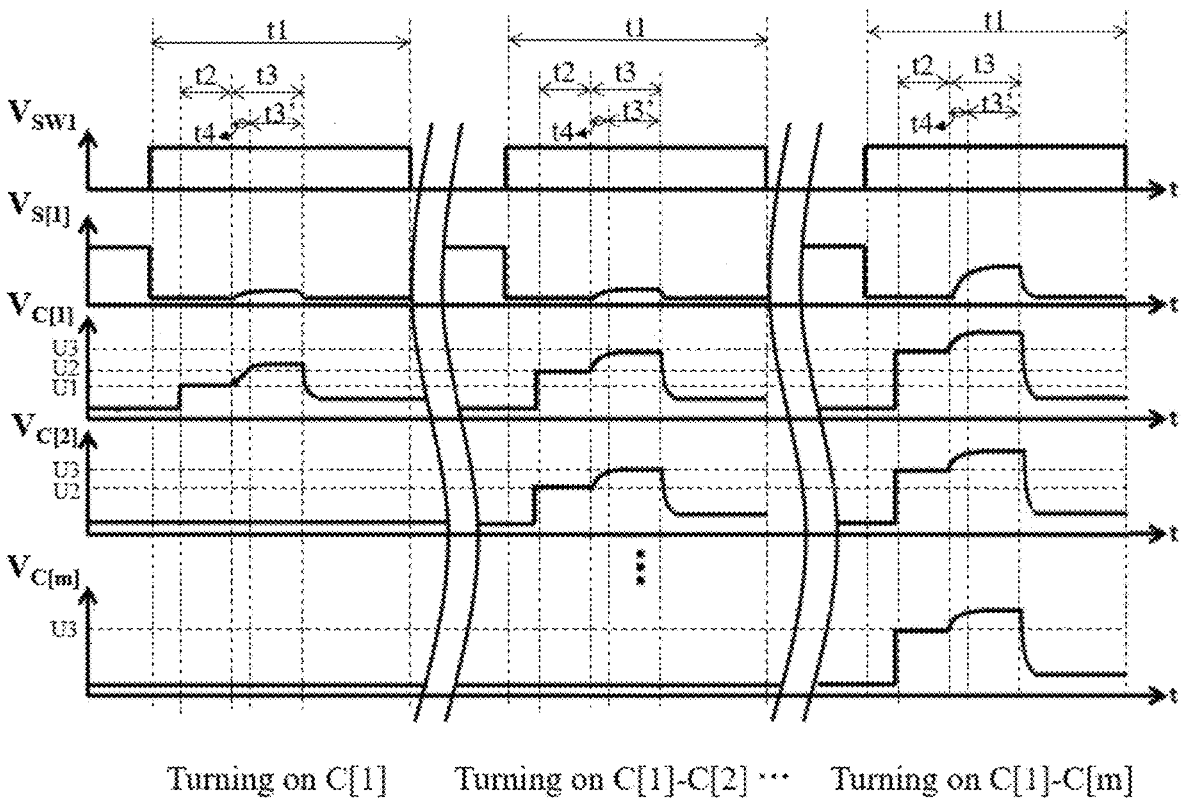
FIG. 4 shows a schematic diagram of signal potentials in a case where the scanning line S[1] is turned on according to an embodiment of the present disclosure.

FIG. 4 shows a schematic diagram of signal potentials in a case where the scanning line S[1] is turned on according to an embodiment of the present disclosure.

As shown in FIG. 4, when the LED panel adopts the common cathode structure, after the voltage adjustment value is determined according to the above-mentioned way, the preset pre-charge voltage value can be correspondingly increased by the voltage adjustment value to obtain the target pre-charge voltage, so that the anode potential of the light emitting diodes is also raised to a higher target pre-charge voltage at the pre-charge stage (i.e., during the pre-charge period t2). For example, as shown in FIG. 4, as the number of the data channels to be turned on increases, the target pre-charge voltages U1, U2 and U3 for pre-charging the data channels to be turned on are also higher and higher. After pre-charging, it only takes a short time (corresponding to the driving current charging period t4) to charge the parasitic capacitor of the light emitting diodes with the driving current to turn it on. Therefore, regardless of the number of the data channels to be turned on, a relatively fixed and short driving current charging period t4 can be maintained, thereby effectively reducing the influence of the cathode potential of the light emitting diodes being raised on the actual turn-on period of the light emitting diodes.

In another embodiment according to the present disclosure, the LED panel may also adopt a common anode structure. FIG. 1(*c*) shows a schematic diagram of an LED display system 100(*c*), which includes an LED panel 101(*c*) with a common anode structure. As shown in FIG. 1(*c*), a column driver 103(*c*) is used to drive a plurality of data channel C[1]~C[m] connected to the cathode of the light emitting diodes, and a scanning circuit 102(*c*) is used to control the turning on and off of a plurality of scanning lines connected to the anode of the light emitting diodes. When display driving, the scanning circuit 102(*c*) connects a scanning line to a high level Vh by turning on a corresponding scanning switch, so as to select a row of light emitting diodes, and then the column driver 103(*c*) can drive some or all of the data channels C[1]~C[m], so as to turn on the corresponding light emitting diodes. The voltage on the equivalent on-resistance of the scanning switch will correspondingly affect and reduce the anode potential of the light emitting diodes. Similarly, for the LED panel with common anode structure, the voltage adjustment value can be determined according to the above-mentioned way, and the preset pre-charge voltage value can be correspondingly reduced by the voltage adjustment value to obtain the target pre-charge voltage, so that the cathode potential of the light emitting diodes can also be reduced to a lower target pre-charge voltage at the pre-charge stage. Therefore, according to an embodiment of the present disclosure, the influence of the anode potential of the light emitting diodes being pulled down on the actual turn-on period of the light emitting diodes can also be reduced in a case of an LED panel with a common anode structure.

It should be noted that, in addition to the LED display system including only a single source driver/column driver and a single scanning circuit shown above with respect to FIGS. 1(*a*) and 1(*c*), the embodiment according to the present disclosure can also be applied to the LED display system structure including a plurality of source drivers/column drivers and a plurality of scanning circuits.

Figure 5A:
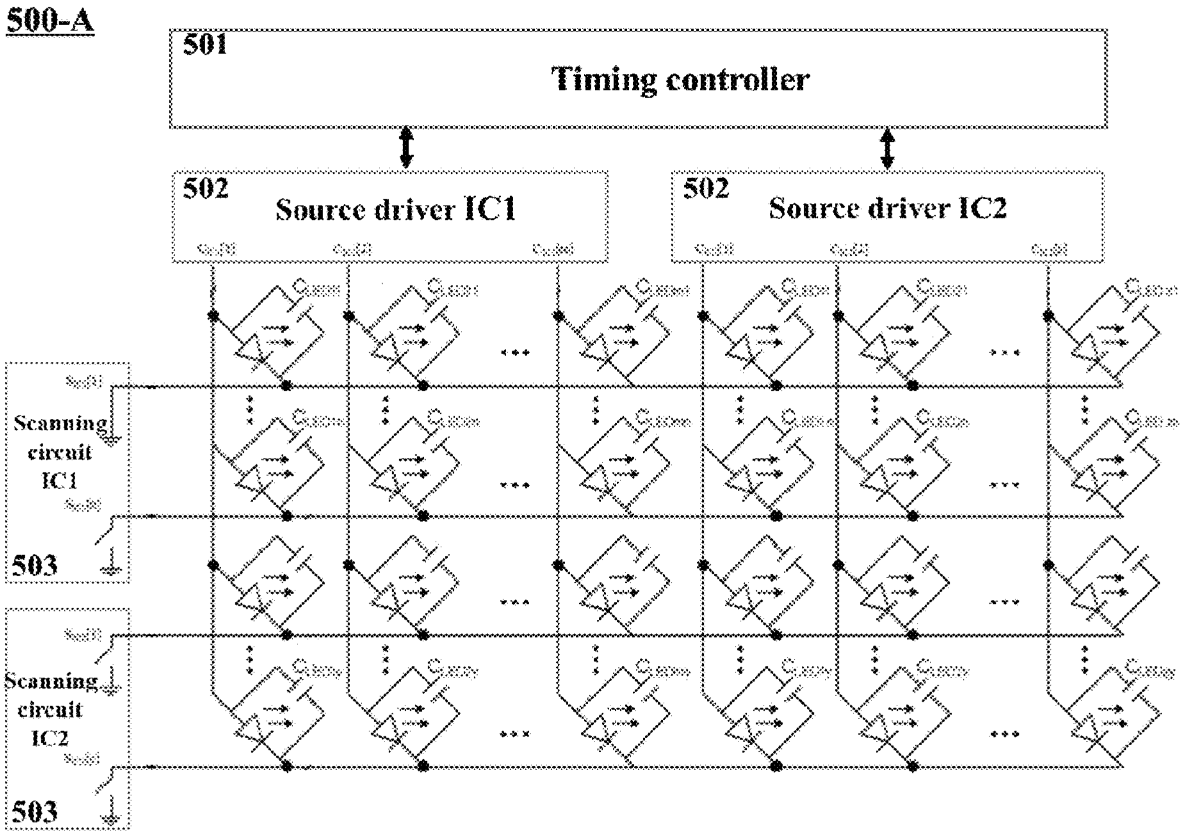
FIG. 5(*a*) shows a schematic diagram of an LED display system 500-A.
Figure 5B:
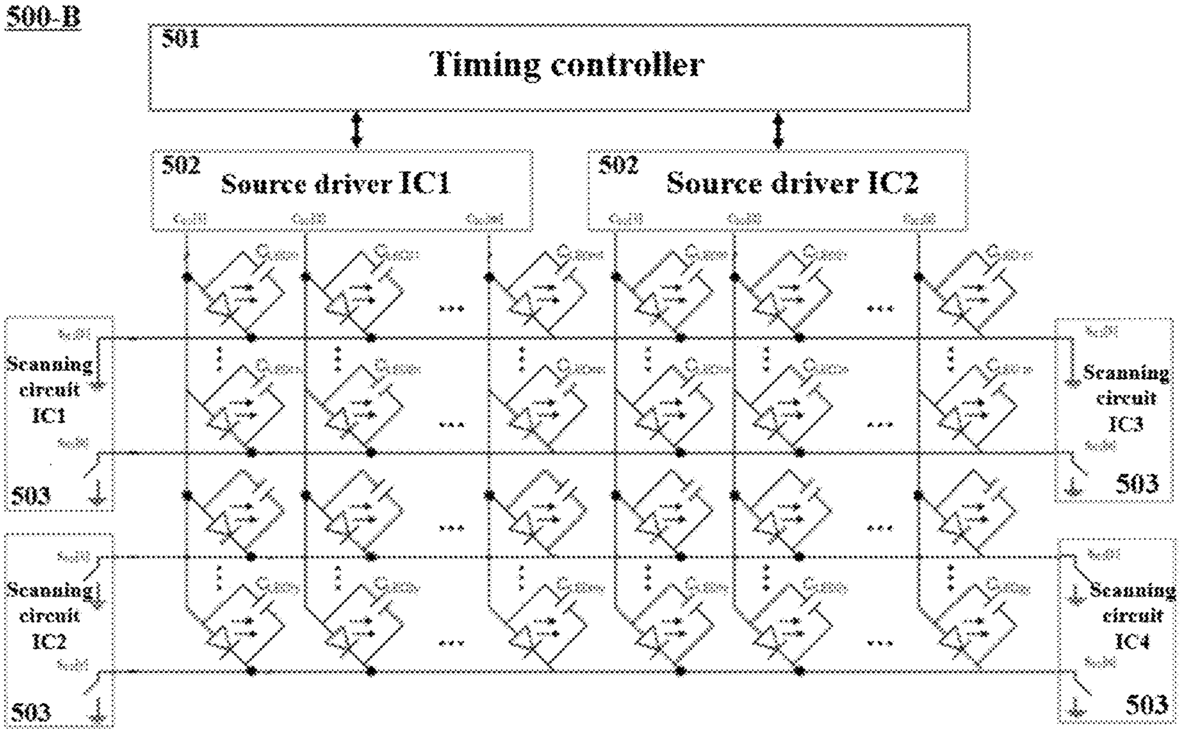

FIG. 5(*a*) shows a schematic diagram of an LED display system 500-A. As shown schematically in FIG. 5(*a*), the LED display system 500-A includes two source drivers 502 and two scanning circuits 503. However, more or less number of source drivers and scanning circuits can be used as required, and there is no limitation here.

As further shown in FIG. 5(*a*), the source driver 502 and the scanning circuit 503 can be realized by using an integrated circuit (IC). In addition, multiple data channels of different source driver ICs (also called column driver ICs) can share same scanning lines. For example, FIG. 5(*a*) shows that (m+z) data channels $C_{IC1}$[1]-$C_{IC1}$[m] and $C_{IC2}$[1]-$C_{IC2}$[z] corresponding to source drivers IC1 and IC2 share (n+y) scanning lines $S_{IC1}$[1]-$S_{IC1}$[n] and $S_{IC2}$[1]-$S_{IC2}$[y]. In this case, obtaining the number of the data channels on the display panel to be turned on during the turn-on period of the scanning line in step S301 may include obtaining the number of the data channels to be turned on corresponding to a plurality of source driver ICs during the turn-on period of the scanning line. That is, the target pre-charge voltage for pre-charging the data channels to be turned on is determined based on the number of the data channels to be turned on corresponding to each source driver IC. For example, referring to FIG. 5(*a*) again, assuming that the scanning line is the scanning line $S_{IC1}$[1], the number of the data channels to be turned on during the turn-on period of the scanning line $S_{IC1}$[1] of the data channels $C_{IC1}$[1]-$C_{IC1}$[m] and $C_{IC2}$[1]-$C_{IC2}$[z] corresponding to the source drivers IC1 and IC2 can be determined. Subsequently, the target pre-charge voltage can be determined by the number of the data channels to be turned on in the same manner as described above, and the data channels to be turned on can be pre-charged based on the target pre-charge voltage.

In addition, FIG. 5(*a*) also shows a time controller (TCON) 501 for controlling the operations of a plurality of source driver ICs. For example, the timing controller 501 may be configured to transfer control parameters such as the pre-charge voltage, the number of the data channels to be turned on, the driving current value and the control commands to the source drivers IC1 and IC2 to control the source drivers IC1 and IC2 to perform operations such as pre-charge and data channel driving. Since the timing controller 501 can know the number of the data channels to be turned on corresponding to each source driver IC it controls and the magnitude of the driving current to be provided to the data channels to be turned on, in one example, the steps 401-402 described above with respect to FIG. 4 can be performed by the timing controller 501 to determine the target pre-charge voltage. After determining the target pre-charge voltage, the timing controller 501 can transfer the target pre-charge voltage to each source driver IC, so that each source driver IC pre-charges its respective data channels to be turned on based on the target pre-charge voltage. However, this is only an example. In another example, the timing controller 501 can transfer the number of the data channels to be turned on (and the size of the driving current to be provided to each of the data channels to be turned on) that it knows to each source driver IC, and they can determine the target pre-charge voltage respectively, and then perform the pre-charge operation accordingly.

It should be noted that the structure of the LED display system 500-A as shown in FIG. 5(*a*) above is only an example. FIG. 5(*b*) shows a schematic diagram of another LED display system 500-B. Compared with FIG. 5(*a*), in order to improve the scanning ability, in addition to the scanning circuits IC1 and IC2 on the left side of the display panel, there are also scanning circuits IC3 and IC4 on the right side of the display panel in FIG. 5(*b*), so that the two scanning circuits on the left and right sides can jointly control the turning on and off of each scanning line.

In this case, when the corresponding scanning switches in the two scanning circuits on the left and right sides are turned on to turn on a row of scanning lines (for example, FIG. 5(*b*) shows that the corresponding scanning switches in the scanning circuits IC1 and IC3 on the left and right sides are turned on to open the first row of scanning lines $S_{IC1}$[1]), the equivalent on-resistance of the corresponding scanning switches in the two scanning circuits is equivalent to parallel connection. Accordingly, in this embodiment, when the voltage adjustment value is determined by using the equivalent on-resistance of the scanning switch, the voltage adjustment value can be determined based on the equivalent resistance values of the equivalent on-resistances of the corresponding scanning switches in two scanning circuits in parallel.

To sum up, by dynamically adjusting the target pre-charge voltage based on the number of the data channels to be turned on, the methods according to the embodiments of the present disclosure can compensate the influence of the voltage of the equivalent on-resistance of the scanning switch on the on-time of the light emitting diodes in advance at the pre-charge stage, thus ensuring the display time of the light emitting diodes.

Next, a pre-charge control device for a display panel according to an embodiment of the present disclosure will be described, which includes: means for obtaining a number of data channels on the display panel to be turned on during a turn-on period of a scanning line; means for determining a target pre-charge voltage for pre-charging the data channels to be turned on based on the number of the data channels to be turned on; and means for pre-charging the data channels to be turned on based on the target pre-charge voltage before turning on the data channels to be turned on.

According to another aspect of the present disclosure, the pre-charge control device may further include means for performing other methods described according to embodiments of the present disclosure.

In addition, a driving method for a display system according to an embodiment of the present disclosure is also described, wherein the display system comprises a display panel, the display panel comprises a plurality of light emitting diodes, as well as a plurality of scanning lines and a plurality of data channels connected with the light emitting diodes, the driving method comprising: turning on a scanning line of the plurality of scanning lines; pre-charging, at a pre-charge stage, data channels on the display panel to be turned on during a turn-on period of the scanning line based on a target pre-charge voltage, wherein the target pre-charge voltage is determined based on a number of the data channels to be turned on; and, providing, at a display stage, a corresponding driving current to the data channels to be turned on.

According to another aspect of the present disclosure, the driving method for the display system further comprises pre-discharging, at a pre-discharge stage before the pre-charge stage, one or more data channels of the plurality of data channels.

According to another aspect of the present disclosure, the display system comprises a plurality of source driver integrated circuits, and wherein, the target pre-charge voltage is determined based on the number of the data channels to be turned on corresponding to each source driver integrated circuit.

According to another aspect of the present disclosure, the display panel is any of an LED display panel, a Mini-LED display panel and a Micro-LED display panel.

Next, a display system according to an embodiment of the present disclosure will be described, including: a display panel comprising a plurality of light emitting diodes, as well as a plurality of scanning lines and a plurality of data channels connected with the light emitting diodes; at least one scanning circuit; at least one source driver; and, a timing controller, wherein the timing controller is configured to: controlling a scanning circuit of the at least one scanning circuit to turn on a scanning line of the plurality of scanning lines; controlling the at least one source driver to pre-charge, at a pre-charge stage, data channels on the display panel to be turned on during a turn-on period of the scanning line based on a target pre-charge voltage, wherein the target pre-charge voltage is determined based on a number of the data channels to be turned on; and, controlling the at least one source driver to provide, at a display stage, a corresponding driving current to the data channels to be turned on. The timing controller may be, for example, the timing controller 501 described above according to FIG. 5(*a*).

According to another aspect of the present disclosure, the at least one source driver is a plurality of source driver integrated circuits, and the target pre-charge voltage is determined based on the number of the data channels to be turned on corresponding to each source driver integrated circuit.

The basic principles of the present disclosure have been described above in connection with specific embodiments. It should be pointed out that the advantages, advantages, effects, etc. mentioned in the embodiments of the present disclosure are only examples rather than limitations, and these advantages, advantages, effects, etc. cannot be considered as necessary for all embodiments of the present disclosure. In addition, the specific details disclosed above are only for the purpose of illustration and easy understanding, but not for limitation, and the above details do not mean that the present disclosure must be realized with the above specific details. It should also be pointed out that in the device and method of the present disclosure, each component or step can be decomposed and/or recombined. These decompositions and/or recombination should be regarded as equivalent schemes of the present disclosure.

For ordinary operators in the field, it can be understood that all or any part of the method and device disclosed in this disclosure can be implemented in hardware, firmware, software or their combination in any computing device (including processor, storage medium, etc.) or network of computing devices. The hardware may be a general-purpose processor, a digital signal processor (DSP), an application-specific integrated circuit (ASIC), a field programmable gate array signal (FPGA) or other programmable logic device (PLD), discrete gate or transistor logic, discrete hardware components, or any combination thereof designed to perform the functions described herein. A general-purpose processor may be a microprocessor, but alternatively, the processor may be any commercially available processor, controller, microcontroller or state machine. A processor may also be implemented as a combination of computing devices, such as a combination of a DSP and a microprocessor, a plurality of microprocessors, one or more microprocessors cooperating with a DSP core, or any other such configuration. Software can exist in any form of computer-readable tangible storage media. By way of example and not limitation, such computer-readable tangible storage media may include RAM, ROM, EEPROM, CD-ROM or other optical disk storage, magnetic disk storage or other magnetic storage devices or any other tangible media that can be used to carry or store desired program codes in the form of instructions or data structures and that can be accessed by a computer. As used herein, a disc includes a compact disc (CD), a laser disc, an optical disc, a digital versatile disc (DVD), a floppy disc and a Blu-ray disc.

The block diagrams of elements, components, equipment, devices and systems involved in the embodiments of the present disclosure are only illustrative examples and are not intended to require or imply that they must be connected, arranged and configured in the manner shown in the block diagram. As those skilled in the art will recognize, these elements, components, devices, devices and systems can be connected, arranged and configured in any way.

In addition, the claimed scope of this disclosure is not limited to the specific aspects of the above-mentioned processing, machinery, manufacturing, composition, means, methods and actions of events. Components, means, methods or actions of processes, machines, manufacturing, and events that currently exist or are to be developed later can be utilized to perform basically the same functions or achieve basically the same results as those described herein.

In addition, words such as “including”, “containing”, “having” and so on are open words, which mean “including but not limited to” and can be used interchangeably with them. The terms “or” and “and” as used herein refer to the terms “and/or” and can be used interchangeably with them unless the context clearly indicates otherwise. The word “such as” used here refers to the phrase “such as but not limited to” and can be used interchangeably with it.

The above description of the disclosed aspects is provided to enable any operator in the art to make or use the present disclosure. Various modifications to these aspects will be obvious to those skilled in the art, and the general principles defined herein can be applied to other aspects without departing from the scope of this disclosure. Therefore, the present disclosure is not intended to be limited to the aspects shown herein, but is to be accorded the widest scope consistent with the principles and novel features disclosed herein.

The invention claimed is:

1. A pre-charge control method for a display panel, comprising:

obtaining a number of data channels on the display panel to be turned on during a turn-on period of a scanning line;

adjusting a target pre-charge voltage for pre-charging the data channels to be turned on based on the number of the data channels to be turned on; and pre-charging the data channels to be turned on based on the adjusted target pre-charge voltage before turning on the data channels to be turned on.

2. The pre-charge control method of claim 1, wherein adjusting the target pre-charge voltage for pre-charging the data channels to be turned on based on the number of the data channels to be turned on comprises:

determining a voltage adjustment value based on the number of the data channels to be turned on; and adjusting a preset pre-charge voltage value of the data channels to be turned on based on the voltage adjustment value, to obtain the target pre-charge voltage for pre-charging the data channels to be turned on.

3. The pre-charge control method of claim 2, wherein determining the voltage adjustment value based on the number of the data channels to be turned on comprises:

determining a preset voltage increment corresponding to each of the data channels to be turned on; and determining the voltage adjustment value based on the preset voltage increment corresponding to each data channel and the number of the data channels to be turned on.

4. The pre-charge control method of claim 3, wherein the data channels to be turned on includes data channels of one or more colors, and wherein, determining the preset voltage increment corresponding to each of the data channels to be turned on comprises:

determining, for data channels of each color, the preset voltage increment corresponding to a single data channel of the color; and, determining the voltage adjustment value based on the preset voltage increment corresponding to each data channel and the number of the data channels to be turned on comprises: determining the voltage adjustment value based on the number of the data channels to be turned on for each color and the preset voltage increment corresponding to a single data channel of the color.

5. The pre-charge control method of claim 4, wherein, determining, for the data channels of each color, the preset voltage increment corresponding to the single data channel of the color comprises:

determining a preset driving current value corresponding to the single data channel of the color; and, determining the preset voltage increment corresponding to the single data channel of the color based on the preset driving current value and an equivalent on-resistance of a scanning switch connected to the scanning line.

6. The pre-charge control method of claim 2, wherein determining the voltage adjustment value based on the number of the data channels to be turned on comprises:

obtaining an amount of driving current to be provided to each of the data channels to be turned on during the turn-on period of the scanning line; and determining the voltage adjustment value based on the amount of driving current to be provided to each of the data channels to be turned on.

7. The pre-charge control method of claim 6, wherein determining the voltage adjustment value based on the amount of driving current to be provided to each of the data channels to be turned on comprises:

determining a driving current sum based on the amount of driving current to be provided to each of the data channels to be turned on; and determining the voltage adjustment value based on the driving current sum and an equivalent on-resistance of a scanning switch connected to the scanning line.

8. The pre-charge control method of claim 2, wherein the display panel adopts a common cathode structure, and the preset pre-charge voltage value is increased based on the voltage adjustment value to obtain the target pre-charge voltage.

9. The pre-charge control method of claim 2, wherein the display panel adopts a common anode structure, and the preset pre-charge voltage value is decreased based on the voltage adjustment value to obtain the target pre-charge voltage.

10. The pre-charge control method of claim 1, wherein obtaining the number of data channels on the display panel to be turned on during the turn-on period of the scanning line comprises:

obtaining the number of data channels on the display panel to be turned on during the turn-on period of the scanning line from an internal controller of a source driver or a controller outside the source driver.

11. The pre-charge control method of claim 1, wherein the display panel is any of an LED display panel, a Mini-LED display panel and a Micro-LED display panel.

12. A pre-charge control device for a display panel, comprising:

means for obtaining a number of data channels on the display panel to be turned on during a turn-on period of a scanning line;

means for adjusting a target pre-charge voltage for pre-charging the data channels to be turned on based on the number of the data channels to be turned on; and means for pre-charging the data channels to be turned on based on the adjusted target pre-charge voltage before turning on the data channels to be turned on.

13. A driving method for a display system, wherein the display system comprises a display panel, the display panel comprises a plurality of light emitting diodes, as well as a plurality of scanning lines and a plurality of data channels connected to the light emitting diodes, the driving method comprising:

turning on a scanning line of the plurality of scanning lines;

pre-charging, at a pre-charge stage, data channels on the display panel to be turned on during a turn-on period of the scanning line based on a target pre-charge voltage, wherein the target pre-charge voltage is adjusted based on a number of the data channels to be turned on; and, providing, at a display stage, a corresponding driving current to the data channels to be turned on.

14. The method of claim 13, further comprising:

pre-discharging, at a pre-discharge stage before the pre-charge stage, one or more data channels of the plurality of data channels.

15. The method of claim 13, wherein the display system comprises a plurality of source driver integrated circuits, and wherein, the target pre-charge voltage is determined based on the number of the data channels to be turned on corresponding to each source driver integrated circuit.

16. The method of claim 13, wherein the display panel is any of an LED display panel, a Mini-LED display panel and a Micro-LED display panel.

17. A display system comprising:

a display panel comprising a plurality of light emitting diodes, as well as a plurality of scanning lines and a plurality of data channels connected to the light emitting diodes;

at least one scanning circuit;

at least one source driver; and, a timing controller, wherein the timing controller is configured to:

controlling a scanning circuit of the at least one scanning circuit to turn on a scanning line of the plurality of scanning lines;

controlling the at least one source driver to pre-charge, at a pre-charge stage, data channels on the display panel to be turned on during a turn-on period of the scanning line based on a target pre-charge voltage, wherein the target pre-charge voltage is adjusted based on a number of the data channels to be turned on; and, controlling the at least one source driver to provide, at a display stage, a corresponding driving current to the data channels to be turned on.

18. The display system of claim 17, wherein the at least one source driver is a plurality of source driver integrated circuits, and the target pre-charge voltage is determined based on the number of the data channels to be turned on corresponding to each source driver integrated circuit.

* * * * *